(12) United States Patent
Palin et al.

(10) Patent No.: US 8,466,790 B2
(45) Date of Patent: Jun. 18, 2013

(54) INFORMATION SHARING IN A SMART SPACE

(75) Inventors: Arto Palin, Viiala (FI); Jukka Pekka Reunamäki, Tampere (FI)

(73) Assignee: Nokia Corporation, Espoo (FI)

( * ) Notice: Subject to any disclaimer, the term of this patent is extended or adjusted under 35 U.S.C. 154(b) by 475 days.

(21) Appl. No.: 12/084,729

(22) PCT Filed: Jul. 20, 2007

(86) PCT No.: PCT/FI2007/050433
§ 371 (c)(1),
(2), (4) Date: Jul. 22, 2010

(87) PCT Pub. No.: WO2009/013385
PCT Pub. Date: Jan. 29, 2009

(65) Prior Publication Data
US 2010/0283613 A1    Nov. 11, 2010

(51) Int. Cl.
*G08B 13/14* (2006.01)
*H04B 5/00* (2006.01)

(52) U.S. Cl.
USPC .......................... 340/572.1; 340/5.1; 709/227

(58) Field of Classification Search
USPC .................... 340/572.1, 5.1, 5.2, 5.21, 539.1, 340/539.11, 539.23; 455/411, 41.1, 41.2, 455/410; 706/45; 709/227
See application file for complete search history.

(56) References Cited

U.S. PATENT DOCUMENTS 7,046,139 B2 * 5/2006 Kuhn et al. .............. 340/539.15
8,041,339 B2 * 10/2011 Teunissen et al. ............ 455/411
2004/0177072 A1 9/2004 Salminen et al. ................. 707/9
2005/0097087 A1 5/2005 Venkata et al. .................... 707/3
2005/0266798 A1 * 12/2005 Moloney et al. ............. 455/41.2
2007/0164847 A1 7/2007 Crawford et al. ............ 340/5.61

FOREIGN PATENT DOCUMENTS

WO    WO 2005/053273 A1    6/2005

OTHER PUBLICATIONS

U.S. Appl. No. 11/809,639, filed May 31, 2007, Palin et al.
Antoniou, et al., "Intuitive Service Discovery in RFID-Enhanced Networks", (2006), (5 pages).
Antoniou, et al., "NFC-Based Mobile Middleware for Intuitive User Interaction with Security in Smart Homes", XP-002665190, (Aug. 2006), (6 pages).
Raverdy, et al., "Efficient Context-Aware Service Discovery in Multi-Protocol Pervasive Environments", (2006), (8 pages).
Raverdy, et al., "A Multi-Protocol Approach to Service Discovery and Access in Pervasive Environments", (Jul. 2006), (8 pages).
Zoe Antoniou and Srikant Varadan; "iTouch: RFID Middleware for Boosting Connectivity & Intuitive User Interaction in Smart Spaces" Nokia Research Center Cambridge; http://research.nokia.com; May 9, 2006 (34 pages).

* cited by examiner

*Primary Examiner* — Toan N Pham
(74) *Attorney, Agent, or Firm* — Harrington & Smith

(57) ABSTRACT

Disclosed is an apparatus including a near field communication unit configured to read usage information pertaining to one or more devices within a certain space; and a processing unit configured to forward at least part of said usage information to one or more devices of another space, such as a personal space comprising devices personally held by a certain user. The certain space may be a smart space. Also related other devices, methods and computer programs are disclosed.

36 Claims, 4 Drawing Sheets

INFORMATION SHARING IN A SMART SPACE

FIELD OF THE INVENTION

The present invention generally relates to short range communications and a smart space type of environment. The invention relates particularly, though not exclusively, to sharing smart space information.

BACKGROUND OF THE INVENTION

In general, short range communication technologies operate in short distances. Such technologies include for example Bluetooth, WLAN (wireless local area network), UWB (ultra-wideband, WUSB (wireless USB) and Wibree.

Short range communication technologies have enabled development of so called smart space environments. The definition of a smart space is many-sided, many times related to ubiquitous computing and smart networking. The term smart space is used herein to refer to a certain space that handles information in a somewhat smart way, either so that devices of the space are for example sharing information relating to connectivity, configuration, security or that the devices are sharing even information relating to actual data in an interoperable manner. In practice a smart space may be a relatively simple system or quite the opposite, a very complex system.

Basically in every smart space there is a Service Provider (SP) and a Service User (SU) and a way how the SP and SU can connect (or interconnect) with each other. This is depicted in FIG. 1. In a simple form, the SP can be for example a Bluetooth printer and the SU for example a mobile terminal, and these devices are interconnected by a Bluetooth connection. This kind of example is easy to handle and can be built upon one connectivity technique. However, generally the SP could offer services over any type of connectivity technique. On the other hand, in some cases, the SP can utilize only some or none of them. How to find proper connectivity technique in this case is more complicated. Furthermore, there may be more than one SPs and SUs. Yet furthermore, mobile devices set limits for powering issues, which further complicates connectivity solutions.

As introduced above, devices in a smart space are operating in a "smart" manner. Ideally all devices are aware of the space, devices and services that are available and allowed to be used. A problem that is not fully considered in current implementations is how to easily adapt to changes in the environment, for example when entering a smart space or when moving from one smart space to another. For example, if a user moves to a meeting room, the user may want to obtain information pertaining to devices/services available in the meeting room. The user may want to know for example, which devices it may connect to (wired or wireless), how it should connect to those devices (available bearers, hidden names, password, security etc.), which services are available through the devices, and which services the user is allowed to use in the devices (e.g. wireless LAN connection, wireless projector etc.).

One known way of sharing smart space information, for example for persons entering the smart space, is to share it with paper notes or verbally. This kind of approach is however somewhat inconvenient, because paper notes get easily lost or it may be difficult to find the right person who is aware of available services in certain space.

Another option is that a device entering a smart space scans the surroundings to discover devices of the smart space and to find out, which bearers the devices have, which services are provided via them, and how to connect with them. Basically, the entering device has to scan the surroundings with each available bearer it has in order to find out whether there are any devices which use any of the available bearers. Because there is no standardized way to arrange this, each bearer has to be activated for a certain period of time to find out other devices. Due to powering issues and possible interference problems between concurrently operating radio technologies it may not be possible to use several bearers at the same time to find out connectivity information of the multiple other devices located in the smart space. This kind of scanning operation consumes a lot of power and may require significant amount of time. The result may yet be that not every device/service in the smart space is discovered.

Still another related solution is disclosed in "Using OWL in a Pervasive Computing Broker" by Harry Chen, Tim Finin and Anupam Joshi, available in http://www.csee.umbc.edu/pub/finin/papers/aamas03a.pdf. In the disclosed system, there are RFID sensors embedded in the walls of a smart space. As a person enters the smart space the RFID sensors detect that for example a cell phone belonging to that person has entered the space. Thereafter the smart space may be adapted to presence of that person. However, this kind of approach requires complicated arrangements within the smart space to provide the means to detect the presence of incoming and outgoing devices, which may make the arrangement costly and not being flexible to changes in configuration of the smart space.

SUMMARY

Now a new approach for sharing smart space information is presented.

According to a first aspect of the invention there is provided an apparatus, comprising:

a near field communication unit configured to read usage information pertaining to one or more devices within a first space; and a processing unit configured to forward at least part of said usage information to one or more devices of a personal space comprising devices personally held by a certain user.

In an embodiment at least one of the following definitions applies to said first space: the space is a smart space, the space is defined by physical constraints, and the space comprises devices configured to offer services to one or more other devices within said space. Additionally or alternatively the first space may be a virtual space defined by virtual constraints.

The other devices to which the services are offered may be mobile or movable devices that may move into or out of the first space. Momentarily, such devices may be part of the (smart) space, e.g. as long as they stay within the space or as long as their existence in that space is allowed.

By using a near field connection for reading the information pertaining to the (smart) space one may achieve the benefit that the information can be read only when the reader is in the smart space, that is, the information may be tied into the space. If far field wireless signals (e.g. WLAN, Bluetooth and GSM) were used, the signals would penetrate through walls and ceiling, whereby it would be difficult to tie the user and the services into the same bounded space (e.g. meeting room). A further advantage that may be achieved is that as near field communication is enabled only when the devices are close to each other, the communication is inherently secure and strong authentication and security measures are not necessarily required. Still further, as the information is not shared to everyone, also security information, such as SSID (service set identifier) and security parameters of a WLAN access point, may be shared.

In an embodiment the apparatus of the first aspect is part of said personal space.

In an embodiment the devices of the personal space are trusted devices in view of said apparatus.

In an embodiment said processing unit is configured to forward said usage information over one or more secure links.

In an embodiment said processing unit is configured to selectively forward said usage information such that only information that may be useful for a certain device is forwarded to said certain device.

In an embodiment said processing unit is configured to forward all of said usage information to all devices of the personal space.

In an embodiment the processing unit is further configured to forward said usage information to a storage device in the personal space to be further distributed to one or more other devices of the personal space.

In an embodiment said processing unit is configured to forward said usage information over a Bluetooth, Wibree, UWB, WUSB and/or RFID connection or some other suitable connectivity technique.

The usage information may comprise for example information identifying devices within the first space, connectivity information, information pertaining to services provided by devices of the first space, setup information, information pertaining to security settings, or any combination thereof.

According to a second aspect of the invention there is provided a storage module, comprising:
a storage area configured to store usage information pertaining to one or more devices within a first space, and
a near field communication unit configured to allow reading said usage information.

In an embodiment at least one of the following definitions applies to said first space: the space is a smart space, the space is defined by physical constraints, and the space comprises devices configured to offer services to one or more other devices within said space.

The usage information may comprise for example information identifying devices within the space, connectivity information, information pertaining to services provided by devices of the space, setup information, information pertaining to security settings, or any combination thereof.

In an embodiment the storage module is part of the smart space.

In an embodiment the storage module is an RFID tag and the near field connection is an RFID connection.

According to a third aspect of the invention there is provided a method, comprising:
reading usage information pertaining to one or more devices within a first space; and
forwarding at least part of said usage information to one or more devices of a personal space comprising devices personally held by a certain user.

According to a fourth aspect of the invention there is provided a method in a storage module, the method comprising:
storing usage information pertaining to one or more devices within a first space, and
allowing reading said usage information over a near field connection.

According to a fifth aspect of the invention there is provided a computer program adapted to enable an apparatus to perform the method of the third aspect or any applicable embodiment.

According to a sixth aspect of the invention there is provided a computer program adapted to enable an apparatus to perform the method of the fourth aspect or any applicable embodiment.

According to a seventh aspect of the invention there is provided an apparatus, comprising:
means for reading usage information pertaining to one or more devices within a first space; and
means for forwarding at least part of said usage information to one or more devices of a personal space comprising devices personally held by a certain user.

According to an eighth aspect of the invention there is provided a storage module, comprising:
means for storing usage information pertaining to one or more devices within a first space; and
means for allowing reading said usage information over a near field connection.

According to a ninth aspect of the invention there is provided a system comprising
a reader apparatus and a storage module, wherein the storage module comprises:
a storage area configured to store usage information pertaining to one or more devices within a first space; and
a near field communication unit configured to allow reading said usage information over a near field connection; and
the reader apparatus comprises:
a near field communication unit configured to read said usage information from said storage module; and
a processing unit configured to forward at least part of said usage information to one or more devices of a personal space comprising devices personally held by a certain user.

According to a further, alternative aspect of the invention, the personal space of the other aspects may be generalized as a second space. That is, usage information relating to devices within a first space is shared to devices within a second space in a centralized manner. In that case the first space of the other aspects may be a personal space, while the second space may be a smart space. Thereby, the flow of information may be in the opposite direction as compared to the flow of information from a smart space to a personal space.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED SPECIFICATION

In the following example implementations of the invention are presented in connection with a smart space.

Figure 1:
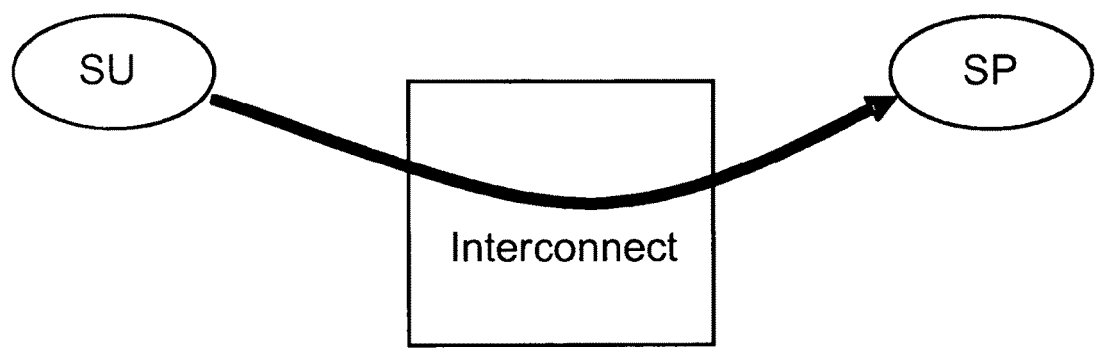
FIG. 1 shows interconnecting in a smart space environment.
Figure 2:
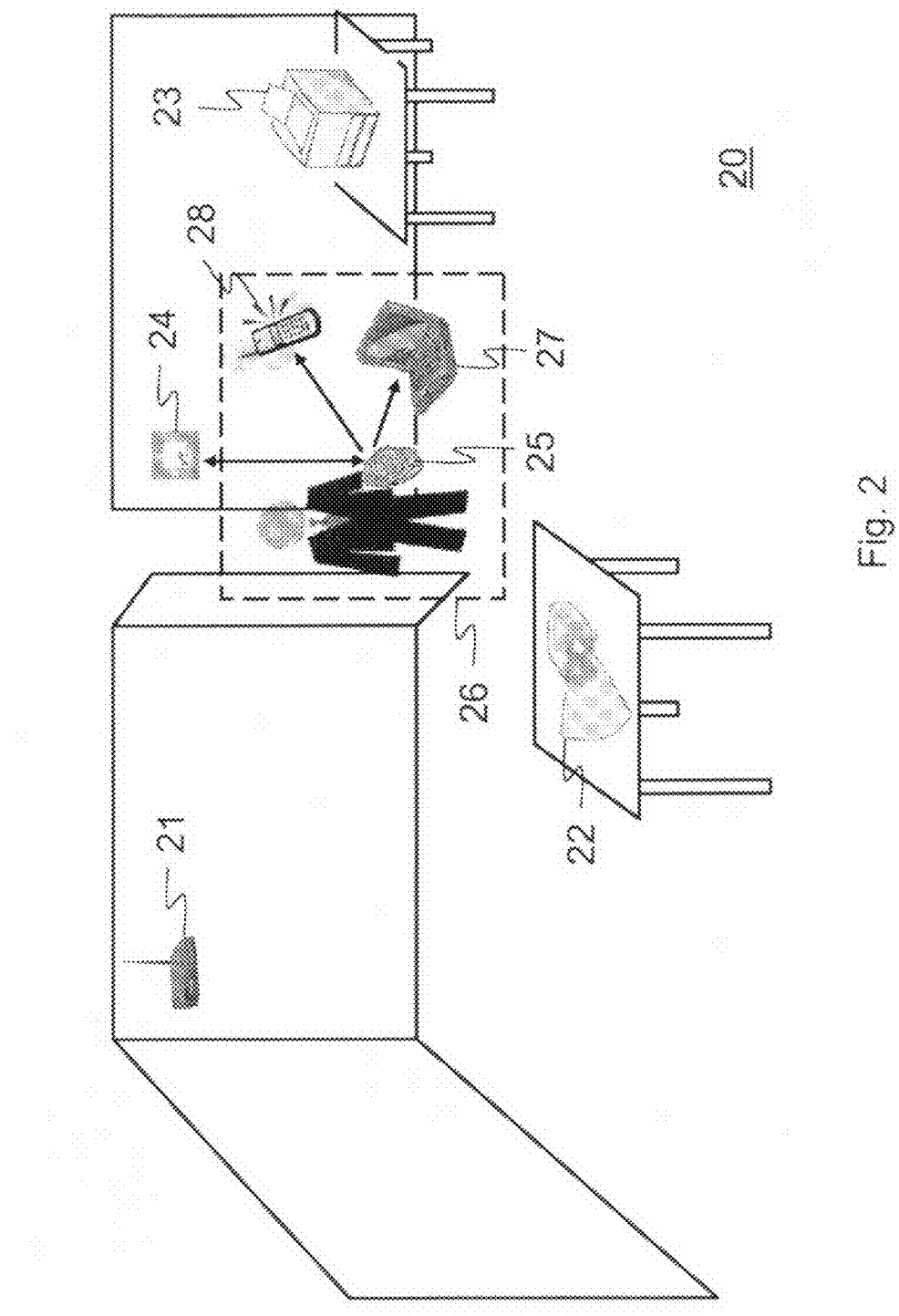
FIG. 2 shows an example of a smart space in accordance with an embodiment.

Turning to FIG. 2, for the purpose of an embodiment, a room 20, for example a meeting room, is considered a smart space. The smart space comprises a WLAN access point 21, a wireless beamer 22 and a wireless printer 23. Each of the devices 21-23 of the smart space may provide different services to other devices or users and may have an ability to use a set of different bearers. In the context of the present invention, the word "bearer" is also understood to include passive technologies such as RFID (radio-frequency identification). Other devices that might be part of the smart space include for example an LCD (liquid crystal display) television, a DVD (digital versatile disk) player, various remote controls, a temperature sensor and so forth.

Further the smart space comprises an RFID tag 24. The tag 24 stores information pertaining to the devices of the smart space and services available in the smart space. The information may include connectivity information such as connectivity methods, like Ethernet, USB (universal serial bus), WLAN (wireless local area network), Bluetooth, UWB (ultra-wideband), WUSB (wireless USB), Wibree and/or connectivity parameters, like WLAN channel, WPANVEP (Wi-Fi protected access/wired equivalent privacy) keys, Bluetooth access information etc. In an embodiment the tag stores a connectivity map relating to various connections between different devices of the smart space. The connectivity information stored in the tag may concern wireless or fixed line connections. Additionally, the connectivity information may concern connectivity information of the smart space as such (if networked), or it can be the connectivity information of the individual devices of the smart space. Hence, the connectivity information may include information regarding connectivity techniques supported by certain device(s) or it can even include information how devices are connected or could connect to each other, thus forming a kind of topology map of smart space connectivity between the devices of the smart space.

Furthermore the smart space information stored in the tag 24 may include link level security information, other security settings required for using one or more services, configuration setups/control information, or any combination thereof. As practical examples, the smart space information may comprise e.g. SSID and security parameters of the WLAN access point 21 or an address of the projector 22 and its capabilities. As another example the smart space information may provide a mapping between services and service bearers, such as, internet access is provided via the WLAN access point 21, wireless printing with the printer 23 is provided via Bluetooth connection and the wireless beamer 22 can be used via an UWB connection.

The smart space information stored in the tag may be static or dynamic. As the configuration of the smart space may change over time it may be beneficial to have a possibility to dynamically change the smart space information stored in the tag. It is possible that each device of the smart space updates its own information to the tag or that there is a centralized repository that collects the information and updates the tag. Also any suitable combination of these options or some other alternative is possible. As a practical example, access to the WLAN access point 21 of the meeting room may be protected with a key1 between 10 am and noon and with a key2 between noon and 2 pm and so forth. In that case the WLAN access point might update the relevant key to the tag as the key changes. Settings of other devices of the smart space may change in a similar manner.

The dashed line illustrates a personal space 26 of a user entering the smart space. In the context of various embodiments of this invention the term personal space refers to devices personally held by a user. The personal space may comprise for example a laptop computer, a mobile phone, a wrist watch and/or a heart rate monitor as well as various other devices that are intended for personal use. In one embodiment, the devices of the personal space are "trusted devices", i.e. devices that are known beforehand. Additionally, there may be a security association between some or all of the devices of the personal space. That is, the devices of the smart space may be configured to communicate with each other over secure links. It must be noted that the security association may exist between all devices belonging to the smart space or only between some of the devices.

In FIG. 2, the personal space comprises a laptop 27, a mobile phone 28 and a wrist watch 25. The wrist watch has near field communication capabilities and is configured to use a near field connection for reading the smart space information stored in the tag 24 of the smart space. Further the wrist watch 25 is configured to share at least part of the information read from the tag with other devices of the personal space, that is, with the laptop 27 and the mobile phone 28. The wrist watch may use any suitable/available bearer for sharing the information to other devices, e.g. Bluetooth, Wibree, UWB, WUSB or RFID may be used. In one embodiment, the information is shared over a secure link between the wrist watch and the other device.

As near field communication is enabled only when communicating devices are close to each other, the communication may be considered inherently secure. Thereby information obtained over a near field connection may be considered to have a certain "level of trust", i.e. the smart space information obtained that way may be treated as "trusted" without additional security measures, which may make the system less complicated than some other systems. Additionally, authentication may be employed in the near field communication connection for added security.

After receiving the smart space information via the wrist watch, the laptop and the mobile phone are ready to use devices and services available in the smart space. For example, the user may connect to internet with the laptop (or with the mobile phone) using the WLAN access point 21 or use the wireless projector 22 and printer 23 with the laptop.

In an embodiment the wrist watch 25 may also convey information to the tag 24. For example information pertaining to the devices entering the space (devices of the personal space) and possibly also user information may be delivered to the tag.

Figure 3:
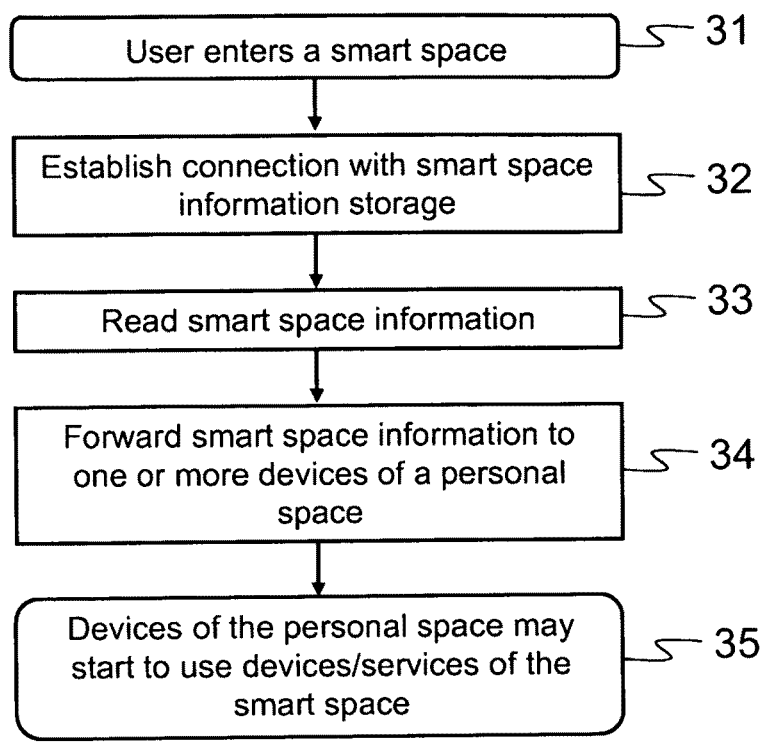
FIG. 3 is a flow diagram illustrating a method in accordance with an embodiment.

FIG. 3 is a flow diagram illustrating a method in accordance with an embodiment.

First a user enters a smart space, phase 31. Responsive to entering the smart space, a personal device held by the user, e.g. a wrist watch or some other suitable device, detects a tag storing information pertaining to the smart space, e.g. the RFID tag 24 of FIG. 2, and establishes a near field connection with the tag, phase 32. The connection establishment phase may include user authentication and security information sharing, but this is not mandatory.

Smart space information available in the tag is then read, phase 33, and forwarded to one or more devices of a personal space of the user, phase 34. In one embodiment the information that is read may be forwarded selectively such that each device of the personal space receives only information that may be useful for it. In another embodiment all available information may be shared with all devices of the personal space.

Thereafter the devices of the personal space may start to use devices/services of the smart space based on the received/forwarded information, phase 35.

Figure 4:
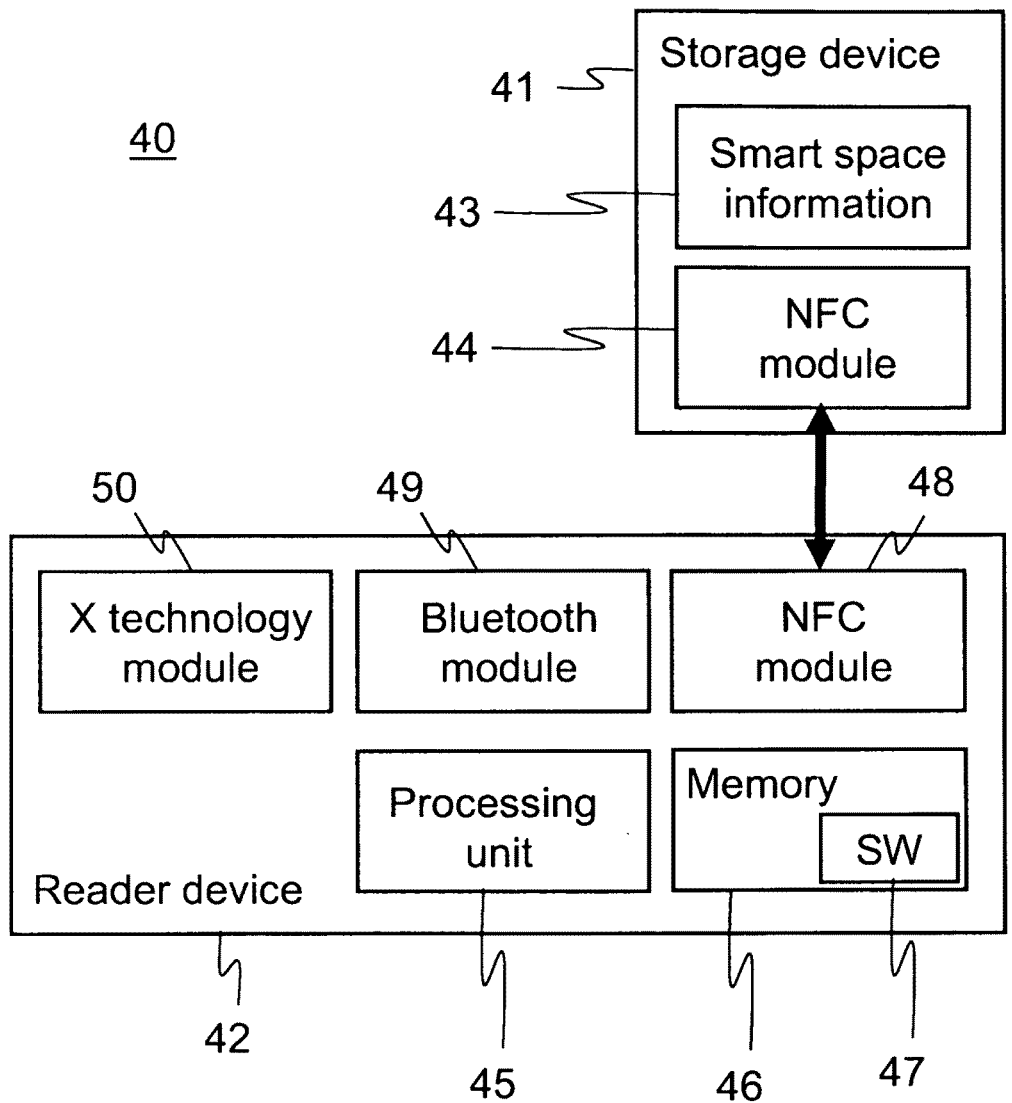
FIG. 4 shows a system comprising a reader device and a storage device in accordance with an embodiment.

FIG. 4 shows a system 40 comprising a reader device or apparatus 41 and a storage device 41. The reader device may be for example an RFID reader or interrogator and the storage device may be for example an RFID tag or transponder.

The storage device 41 comprises a storage area 43, which stores smart space information, and a near field communication module 44, which is configured to allow reading the smart space information stored in the storage area.

The storage device may be a passive, semi-passive or active tag. In case of passive tag, the power that is needed to operate and read/write the tag is transferred from the reader device to the tag by using magnetic or electromagnetic fields. For this reason the tag can operate without its own power supply (e.g. battery). In case of semi-passive tag, power needed for operating the tag is supplied from tag's own power source, but magnetic or electromagnetic field generated by the reader device is used for carrying data between the tag and the reader device in both directions. In case of active tag, the tag uses its own power supply for read and write operations and also for communication back to the reader device.

The reader device 42 comprises a processing unit 45 for controlling the device and a memory 46 including a computer program code or software 47. The processing unit may be for example a central processing unit (CPU), a general-purpose processor, a microprocessor, a digital signal processor, an application specific integrated circuit, a field programmable gate array, a microcontroller or a combination of such elements. The software 47 includes instructions for the processing unit 45 to control the device 42 such as an operating system and different computer applications. The software 47 may comprise instructions for controlling the device to provide some functionality of the invention.

The reader device 42 further comprises a near field communication unit 48 that may be used for reading for example the smart space information from the tag 41. In addition to reading information through the NFC unit the reader device may be further configured to also write information through the NFC unit.

Additionally, the reader device comprises a Bluetooth communication unit 49 that may be used for forwarding smart space information read from the tag 41 to one or more devices of a personal space. Still further the reader device may comprise some other communication unit, denoted herein as an X technology unit 50 that may be used for the same purposes as the Bluetooth unit 49 and/or for some other communication purposes. It must be noted that the unit 50 is not mandatory. Alternatively, the reader device might comprise still further communication units (not shown). For example Wibree, UWB, WUSB, WLAN or cellular communication unit may be included in the reader device.

One must note that the communication interfaces 48-50 may be used for other communication purposes than those mentioned above, as well. Additionally or alternatively, in an embodiment the reader device may comprise only the NFC communication interface and not the others shown in FIG. 4. In that case the NFC unit is used for forwarding the smart space information as well.

The reader device 42 could comprise also a user interface (not shown), such as a display and some input device.

According to an embodiment the reader device 42 is some device that the users typically always carry with them, such a as wrist watch or some other personal device.

Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. An apparatus, comprising:
a near field communication unit configured to read connectivity information pertaining to one or more devices within a first space, wherein the connectivity information includes supported connectivity techniques and corresponding connectivity parameters for connecting to the one or more devices within the first space; and
a short-range communication unit configured to forward at least part of said connectivity information to one or more devices of a personal space comprising devices personally held by a certain user.

2. The apparatus of claim 1, wherein at least one of the following definitions applies to said first space: the space is a smart space, the space is defined by physical constraints, and the space comprises devices configured to offer services to one or more other devices within said space.

3. The apparatus of claim 1, wherein said apparatus is part of said personal space.

4. The apparatus of claim 1, wherein the devices of the personal space are trusted devices in view of said apparatus.

5. The apparatus of claim 1, wherein said short-range communication unit is configured to forward said connectivity information over one or more secure links.

6. The apparatus of claim 1, wherein said short-range communication unit is configured to selectively forward said connectivity information such that only information that may be useful for a certain device is forwarded to said certain device.

7. The apparatus of claim 1, wherein said short-range communication unit is configured to forward all of said connectivity information to all devices of the personal space.

8. The apparatus of claim 1, wherein the short-range communication unit is further configured to forward said connectivity information to a storage device in the personal space to be further distributed to one or more other devices of the personal space.

9. The apparatus of claim 1, wherein said short-range communication unit is configured to forward said connectivity information over a Bluetooth, Wibree, UWB, WUSB and/or RFID connection.

10. The apparatus of claim 1, wherein said connectivity information comprises information identifying devices within the space, information pertaining to services provided by devices of the space, setup information, information pertaining to security settings, or any combination thereof.

11. A storage module, comprising:
a storage area configured to store connectivity information pertaining to one or more devices within a first space, and
a near field communication unit configured to allow reading said connectivity information over a near field connection.

12. The storage module of claim 11, wherein at least one of the following definitions applies to said first space: the space is a smart space, the space is defined by physical constraints, and the space comprises devices configured to offer services to one or more other devices within said space.

13. The storage module of claim 12, wherein the storage module is part of the smart space.

14. The storage module of claim 11, wherein said connectivity information comprises information identifying devices within the space, information pertaining to services provided by devices of the space, setup information, information pertaining to security settings, or any combination thereof.

15. The storage module of claim 11, wherein the storage module is an RFID tag and the near field connection is an RFID connection.

16. A method, comprising:
reading connectivity information pertaining to one or more devices within a first space; and
forwarding at least part of said connectivity information to one or more devices of a personal space comprising devices personally held by a certain user.

17. The method of claim 16, wherein at least one of the following definitions applies to said first space: the space is a smart space, the space is defined by physical constraints, and the space comprises devices configured to offer services to one or more other devices within said space.

18. The method of claim 16, further comprising
conducting said method in an apparatus, which is part of said personal space.

19. The method of claim 18, wherein the devices of the personal space are trusted devices in view of said apparatus.

20. The method of claim 16, further comprising forwarding said connectivity information over one or more secure links.

21. The method of claim 16, further comprising
selectively forwarding said connectivity information such that only information that may be useful for a certain device is forwarded to said certain device.

22. The method of claim 16, further comprising
forwarding all of said connectivity information to all devices of the personal space.

23. The method of claim 16, further comprising
forwarding said connectivity information to a storage device in the personal space to be further distributed to one or more other devices of the personal space.

24. The method of claim 16, further comprising
forwarding said connectivity information over a Bluetooth, Wibree, UWB, WUSB and/or RFID connection.

25. The method of claim 16, wherein said connectivity information comprises information identifying devices within the space, information pertaining to services provided by devices of the space, setup information, information pertaining to security settings, or any combination thereof.

26. A method in a storage module, the method comprising:
storing connectivity information pertaining to one or more devices within a first space, and
allowing reading said connectivity information over a near field connection.

27. The method of claim 26, wherein at least one of the following definitions applies to said first space: the space is a smart space, the space is defined by physical constraints, and the space comprises devices configured to offer services to one or more other devices within said space.

28. The method of claim 26, wherein said connectivity information comprises information identifying devices within the space, information pertaining to services provided by devices of the space, setup information, information pertaining to security settings, or any combination thereof.

29. The storage module of claim 26, wherein the storage module is an RFID tag and the near field connection is an RFID connection.

30. A non-transitory memory medium comprising computer executable program code adapted to enable an apparatus to perform the method of claim 16.

31. A non-transitory memory medium comprising computer executable program code adapted to enable an apparatus to perform the method of claim 26.

32. An apparatus, comprising:
means for reading connectivity information pertaining to one or more devices within a first space; and
means for forwarding at least part of said connectivity information to one or more devices of a personal space comprising devices personally held by a certain user.

33. A storage module, comprising:
means for storing connectivity information pertaining to one or more devices within a first space; and
means for allowing reading said connectivity information over a near field connection.

34. A system comprising a reader apparatus and a storage module, wherein the storage module comprises:
a storage area configured to store connectivity information pertaining to one or more devices within a first space; and
a near field communication unit configured to allow reading said connectivity information over a near field connection; and the reader apparatus comprises:
a near field communication unit configured to read said connectivity information from said storage module; and
a short-range communication unit configured to forward at least part of said connectivity information to one or more devices of a personal space comprising devices personally held by a certain user.

35. The system of claim 34, wherein at least one of the following definitions applies to said first space: the space is a smart space, the space is defined by physical constraints, and the space comprises devices configured to offer services to one or more other devices within said space.

36. The system of claim 34, wherein said storage module is part of said first space and said reader apparatus is part of said personal space.

* * * * *